March 19, 1929.  I. F. KINNARD  1,706,171
TEMPERATURE COMPENSATION FOR MAGNETS
Filed May 5, 1924
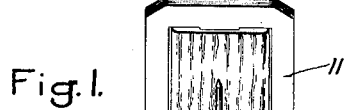
Fig. 1.
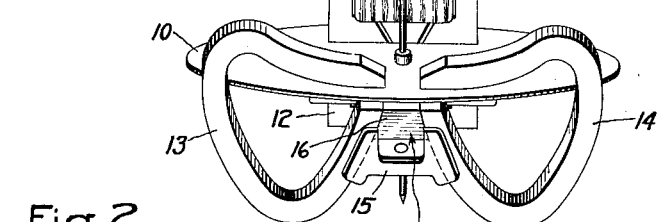
Fig. 2.  Fig. 3.
HAVE NEGATIVE TEMPERATURE COEFFICIENT OF PERMEABILITY
Fig. 4.
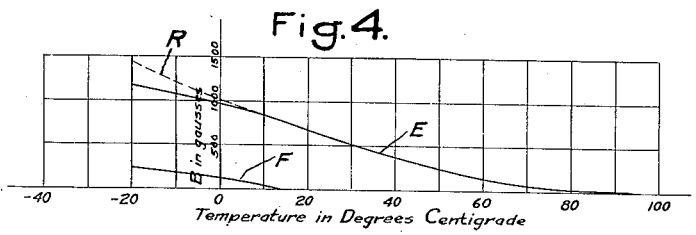
Fig. 5.
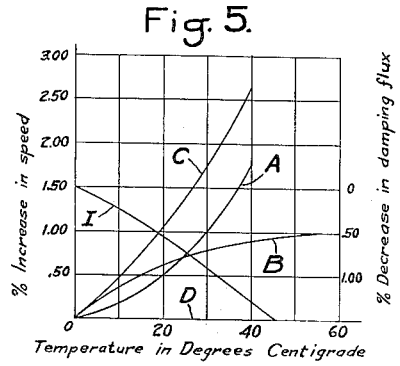
Fig. 6.
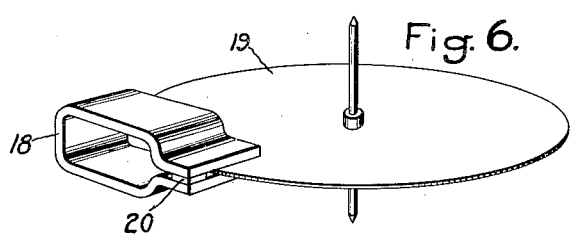
Inventor:
Isaac F. Kinnard,
by *Alexander F. [signature]*
His Attorney Patented Mar. 19, 1929.

1,706,171

UNITED STATES PATENT OFFICE.

ISAAC F. KINNARD, OF LYNN, MASSACHUSETTS, ASSIGNOR TO GENERAL ELECTRIC COMPANY, A CORPORATION OF NEW YORK.

TEMPERATURE COMPENSATION FOR MAGNETS.

Application filed May 5, 1924. Serial No. 711,023.

My invention relates to a method and means for compensating for temperature errors in magnets and although not limited thereto, my invention is particularly useful for compensating for the flux changes occurring in the magnets used in induction watthour meters due to changes in temperature and the invention will be described as applied for such use.

It is known that there is a decided decrease in the flux of the usual permanent magnet, such as those used for damping magnets in meters, when the temperature of the magnet is raised. This relationship between flux and temperature change is very nearly linear and is reversible in its effect, that is, although the flux strength of such a magnet may fall off slightly when heated from zero degrees to 50° C., it regains its original strength when cooled to its former temperature. The reason for this phenomena is not well understood, but the fact remains that it does exist and needs to receive consideration if the meter equipped with such a magnet is to be accurate over the usual temperature range liable to be met with in service. I have also found that the driving torque fluxes of an alternating current induction watthour meter change with temperature and the change, instead of being a decrease with increase in temperature, is an increase with increase in temperature, the change being somewhat less than the change in a permanent magnet flux for corresponding temperature changes. This behavior of the driving flux is probably due to a slight increase in the permeability of the iron used in the driving element. Here again, it is not essential that the exact reasons for this flux change be known so long as the manner in which it does change is taken into consideration and corrected for. The increase in the driving torque flux of the induction watthour meter, which is occasioned by an increase in temperature, occurs at all power factors. However, as the power factor of the ordinary induction watthour meter decreases from unity, there occurs an erroneous shifting of the phase relation between the current coil flux and the potential coil flux which is due to the heating up of the potential winding and the lag plate which may result in a decrease in the driving torque with temperature rise. It will presently appear that by means of my invention I may correct for temperature errors at any particular power factor. However, I prefer to make the resistance of the potential coils of the watthour meter very low and use a small lag plate having a negligible temperature coefficient of resistance so that no appreciable change in the phase relation of the current and potential fluxes will occur at a given power factor due to changes in temperature.

It is the primary object of my invention to provide means for compensating for temperature errors in magnets and in particular to provide an induction type watthour meter in which the magnet temperature errors are compensated for. In carrying my invention into effect, I provide a temperature responsive magnetic shunt for the magnet or magnets in question, which shunt has a temperature coefficient of permeability, generally negative, of the correct magnitude and character to compensate for the error or errors in question.

The features of my invention which I believe to be novel and patentable will be pointed out in the claims appended hereto. For a better understanding of my invention, reference is made in the following description to the accompanying drawing in which Fig. 1 shows the application of my invention to an induction type watthour meter; Fig. 2 shows a magnetic shunt built in accordance with my invention; Fig. 3 shows a composite magnetic shunt made up of sections having different temperature coefficients of permeability; Fig. 4 shows permeability-temperature curves characteristic of my magnetic shunts; Fig. 5 shows curves characteristic of the flux temperature errors occurring in induction watthour meters, which errors are corrected for by my invention; and Fig. 6 shows the application of my invention for correcting the temperature error in a simple damping magnet system.

Referring now to Fig. 1, 10 represents the rotatable disk of an induction type watthour meter. The driving magnet system is shown as a well known type having a potential magnet 11 above the disk and a cooperating current magnet 12 below the disk. Preferably, the potential coil is made somewhat larger than usual so as to provide the desired number of ampere turns at a very low resistance as compared to the reactance of the coil. The meter is provided with the usual damping magnets 13 and 14 held in place by the usual clamp 15.

Referring now to the curves of Fig. 5, the abscissa represents temperature change and the ordinates represent, for curve I, per cent changes in damping flux, and, for curves A, B, C and D, per cent change in meter speed at a constant load. The usual damping magnet has a decrease in damping flux across the air gap due to increase in temperature as represented by the curve I. This would cause an increase in the meter speed at a constant load as represented by the curve A. At constant load the driving force flux increases with temperature such as would cause an increase in speed represented by the curve B. Thus, the resultant temperature speed error would be the sum of curves A and B, or curve C. Now, it is conceivable that if we provide a damping magnet which produces an increase in flux across the air gap as the temperature increases, we may not only eliminate the error corresponding to curve A, but we may in addition compensate for the curve B error. In accordance with my invention, I make the damping magnets 13 and 14 of Fig. 1 slightly stronger than usual and shunt a small portion of the flux so that it does not cut the meter disk by means of a shunt 16 which has a negative temperature coefficient of permeability, that is to say, the permeability of the shunt decreases with rise in temperature. The characteristics of the shunt 16 are such that the amount of flux cutting the meter disk increases with temperature in an amount sufficient to compensate for the resultant meter error C of Fig. 5. Consequently, the resultant temperature speed error is nil and corresponds to the horizontal line D.

I have found that certain alloys of copper and nickel are suitable for the purpose of shunt 16. An alloy which I have found to be very satisfactory is made up of 70% nickel and 30% copper. Some grades of commercial nickel contain, among other impurities, a small percentage of iron and I have found that a small percentage of iron is beneficial, although not essential, for the properties which are desired in the magnetic shunt. Consequently, I prefer to use in this alloy, a nickel which contains approximately 3⅓% iron. In preparing this material, I prefer to cast the molten mixture in a mold and allow it to cool slowly. The characteristics of a shunt thus prepared are shown in curve E of Fig. 4. In this figure the abscissa represents changes in temperature and the ordinates represent flux density of the magnetic shunt for a constant magnetizing force. The curve E shows the manner in which the permeability of shunt 16 decreases with an increase in temperature over the temperature range generally met with for meter operation.

The shunt 16 is in this case given the shape of a flat topped pyramid so as to fit snugly in between the north and south poles of the permanent magnets 13 and 14 closely adjacent the meter disk. The dimensions of the shunt for this particular application are such as to divert approximately from zero to nearly 4% of the flux from the meter disk as the temperature varies from about 100° C. down to about 20° C. The dimensions at the base of such a shunt, when used with a meter such as I have described and of the usual dimensions, is approximately ½ x ¾ inches and the other dimensions are proportioned substantially as shown in Figs. 1 and 2.

Due to the fact that the flux temperature characteristics of the magnets and compensating materials are not exactly linear, especially at temperatures below 20° C., I have found it desirable, where low temperatures are to be encountered, to use a composite magnetic shunt, such as shown in Fig. 3, made up of parallel sections 16′ and 17 of approximately equal width. Section 16′ is made to have the same characteristics as shown in curve E of Fig. 4 and the section 17 is made to have the characteristics shown in curve F of Fig. 4. An alloy prepared as before, but containing about 60% nickel and 40% copper will give the characteristics of curve F. It will be noted that the permeability of the section 17 disappears entirely at about 13° C. The resultant effect of the two parallel shunts 16′ and 17 is a slightly more desirable resultant permeability temperature curve at low temperatures, as indicated by the dotted line R in Fig. 4.

The characteristics of the shunt may be changed by changing the percentage composition of the materials used in the alloys or by varying the number and dimensions of the section of a shunt made up of more than one section having different characteristics and I do not wish to limit my invention to any particular alloy or sectional arrangement, since it will be evident that different degrees of compensation may be required for different conditions and types of meters.

In Fig. 6 I have shown the application of my invention to a simple induction disk damping magnet system for eliminating the temperature errors thereof. In this modification the damping magnet 18 cooperates with the rotatable disk 19 and the corners of the magnet pole pieces extend beyond the periphery of the disk. Between these corners of the pole pieces a shunt 20 is fixed and this shunt has a decided negative temperature coefficient of permeability sufficient to compensate for the damping error due to the natural decrease in magnetization of the permanent magnet with increase in temperature and the error occasioned by the increase in resistance of the disk with increase in temperature. The characteristics of shunt 20 should be such as to produce an increase in the flux cutting the disk with increase in temperature in order that the damping effect will be maintained constant at any given speed in the working range of temperature variation.

As thus far described I have illustrated the temperature responsive shunt applied only to damping magnets and in this connection, I have shown how the shunt may compensate for errors which arise outside of the damping magnet system as well as those due to the damping magnet system alone. However, I do not wish to limit my invention to the application of the temperature responsive shunt to damping magnets or to permanent magnets as it will be evident that the invention is applicable wherever the strength of a magnet of any kind or description is susceptible to temperature changes, or where an element associated with the magnet in question is susceptible to temperature changes. Consequently, I intend to cover all applications and modifications of my invention which fall fairly within its true spirit and scope.

In accordance with the provisions of the patent statutes, I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States is:—

1. An induction disc type watthour meter having a permanent magnet damping system which is inherently stronger than is required to damp the meter at temperatures below about 80 degrees centigrade, and means for passing the excess damping flux around the disc of said meter comprising a magnetic shunt secured in fixed relation to said system, said shunt having a substantially linear negative temperature coefficient of permeability between about 20 and 80 degrees centigrade.

2. A magnetic shunt for magnets made up of parallel sections of nickel copper alloys, one section having substantially 70% nickel and 30% copper and the other section having substantially 60% nickel and 40% copper.

3. An induction type watthour meter having a driving magnetic system which is subject to an increase in driving torque flux due to temperature rise, a permanent magnet damping system for said meter inherently susceptible to a decrease in strength due to temperature rise and a temperature responsive magnetic shunt secured in fixed relation with said damping magnetic system arranged to cause the effective damping flux thereof to increase with temperature.

4. A damping magnet system comprising a rotatable disk of conducting material, a pair of C-shaped permanent magnets cooperating with said disk, a support for holding said magnets in position with north and south poles of each magnet on opposite sides of the disk and with north and south poles of the separate magnets adjacent each other, and a magnetic shunt having a negative temperature coefficient of permeability between adjacent poles of said magnets.

5. An alternating current induction disk watt hour meter having a plurality of magnetic circuits susceptible to flux temperature errors at a given power factor and a magnetic member having a negative temperature coefficient of permeability secured in fixed relation to one of said magnetic circuits for shunting a variable portion of its flux such as to correct the meter for the resultant temperature error of the meter at such power factor.

6. An induction type watthour meter having a driving magnet system which is subject to an increase in flux due to a temperature rise and having a damping magnet system which is subject to an increase in flux due to a temperature rise, the increase in damping flux being sufficient to compensate for the increase in driving flux and thereby prevent any appreciable error in the meter speed due to such flux changes.

7. In an electric meter a magnet provided with an air gap, a two-part magnetic shunt associated with said magnet for shunting a variable portion of the flux of said magnet around the air gap in response to temperature changes, the two parts of said shunt having negative temperature permeability characteristics but operating over different temperature ranges such that the temperature compensation of said meter is obtained entirely by one part over one range of temperature and by both parts over a lower range of temperature.

8. An electromagnetic measuring device having a permanent magnet provided with an air gap, an armature of conducting material rotatably mounted adjacent to the air gap of said permanent magnet so as to be cut by at least a portion of the flux of said air gap, and a magnetic alloy member comprising approximately 30% copper, 68% nickel and 2% iron secured in fixed relation with said permanent magnet adjacent said air gap, said alloy having a substantially linear negative temperature coefficient of permeability over a temperature range in excess of 50 centigrade degrees and serving to modify the flux cutting said armature with temperature changes so as to compensate said device for temperature errors over such temperature range.

9. An induction watthour meter comprising a rotatably mounted disc of conducting material, a stationary electromagnetic system for driving said disc, a stationary drag magnet system for damping said disc, both of said magnetic systems being inherently susceptible to a variation in flux with changes in temperature the combined effect of which would be to produce a resultant temperature error of the meter if not compensated for, and a stationary member having a negative temperature coefficient of permeability associated with one of said magnetic systems, said member serving to vary the flux distribution of the magnetic system with which it is associated in a manner and to the extent necessary to substantially compensate for the combined meter temperature error of said two magnetic systems.

10. An induction type watthour meter having a rotatably mounted disc of conducting material, a stationary driving magnet system and a stationary damping magnetic system cooperating with said disc, said meter as thus comprised having a temperature error at a given power factor, and a stationary member, composed essentially of copper and nickel and having a negative temperature coefficient of permeability, associated in fixed relation with one of said magnetic systems and serving to modify the flux distribution thereof with changes in temperature in a manner and to the extent necessary to substantially correct said meter for such temperature error.

In witness whereof, I have hereunto set my hand this thirtieth day of April, 1924.

ISAAC F. KINNARD.